United States Patent (10) Patent No.: US 9,935,521 B2
Tsuda et al. (45) Date of Patent: Apr. 3, 2018

(54) MOTOR ACTUATOR

(71) Applicant: TGK CO., LTD., Tokyo (JP)

(72) Inventors: Hitoshi Tsuda, Tokyo (JP); Takashi Sannomiya, Tokyo (JP); Yasuaki Kaneko, Tokyo (JP)

(73) Assignee: TGK CO., LTD., Tokyo (JP)

( * ) Notice: Subject to any disclaimer, the term of this patent is extended or adjusted under 35 U.S.C. 154(b) by 323 days.

(21) Appl. No.: 14/715,508

(22) Filed: May 18, 2015

(65) Prior Publication Data

US 2015/0381016 A1 Dec. 31, 2015

(30) Foreign Application Priority Data

May 21, 2014 (JP) .................. 2014-105633

(51) Int. Cl.
*H02K 11/00* (2016.01)
*H02K 5/22* (2006.01)
*H02K 11/21* (2016.01)
*H02K 11/35* (2016.01)

(52) U.S. Cl.
CPC ............. *H02K 5/225* (2013.01); *H02K 11/21* (2016.01); *H02K 11/35* (2016.01)

(58) Field of Classification Search
CPC ...... H02K 5/225; H02K 3/28; H02K 11/0094; H02K 2203/03; H02K 2211/03; H02K 11/21; H02K 5/04; H02K 15/0062; H02K 15/14
USPC ........................................... 310/71
See application file for complete search history.

(56) References Cited

U.S. PATENT DOCUMENTS

| 7,573,167 B2 | 8/2009 | Miyamoto et al. ............. 310/99 |
| 2008/0036316 A1 | 2/2008 | Miyamoto et al. ............. 310/71 |
| 2008/0224553 A1* | 9/2008 | Abe ........................ H02K 5/15 310/71 |

FOREIGN PATENT DOCUMENTS

| JP | H07200011 A | 8/1995 | ............. G05B 15/02 |
| JP | 2005008030 A | 1/2005 | ............. B60H 1/00 |
| JP | 2013-183554 | 9/2013 | ............. H02K 11/00 |

OTHER PUBLICATIONS

CN App. No. 201510245824.X, Text of the First Office Action, and Search Report, English language, dated Oct. 11, 2017.
(Continued)

*Primary Examiner* — Jianchun Qin
(74) *Attorney, Agent, or Firm* — Martine Penilla Group, LLP

(57) ABSTRACT

A motor actuator includes a rotation sensor and a circuit board both of which are contained in a housing. The rotation sensor includes a rotation detection pattern for generating a detection signal indicating a rotational position of an output shaft, and an output terminal capable of outputting the detection signal from the rotation detection pattern. A terminal connection part to which the output terminal is connected is provided in the circuit board, and electronic components including a communication control unit for controlling the communications with an external control apparatus are mounted on the circuit board.

10 Claims, 13 Drawing Sheets

(56) References Cited

OTHER PUBLICATIONS

CN App. No. 201510245824.X, Text of the First Office Action, and Search Report, Chinese language, dated Oct. 11, 2017.
Japanese App. No. 2014-105633, Notification of Reason(s) for Refusal, English language, Dispatch No. 008035, dated Jan. 16, 2018.
Japanese App. No. 2014-105633, Notification of Reason(s) for Refusal, Japanese language, Dispatch No. 008035, dated Jan. 16, 2018.

* cited by examiner

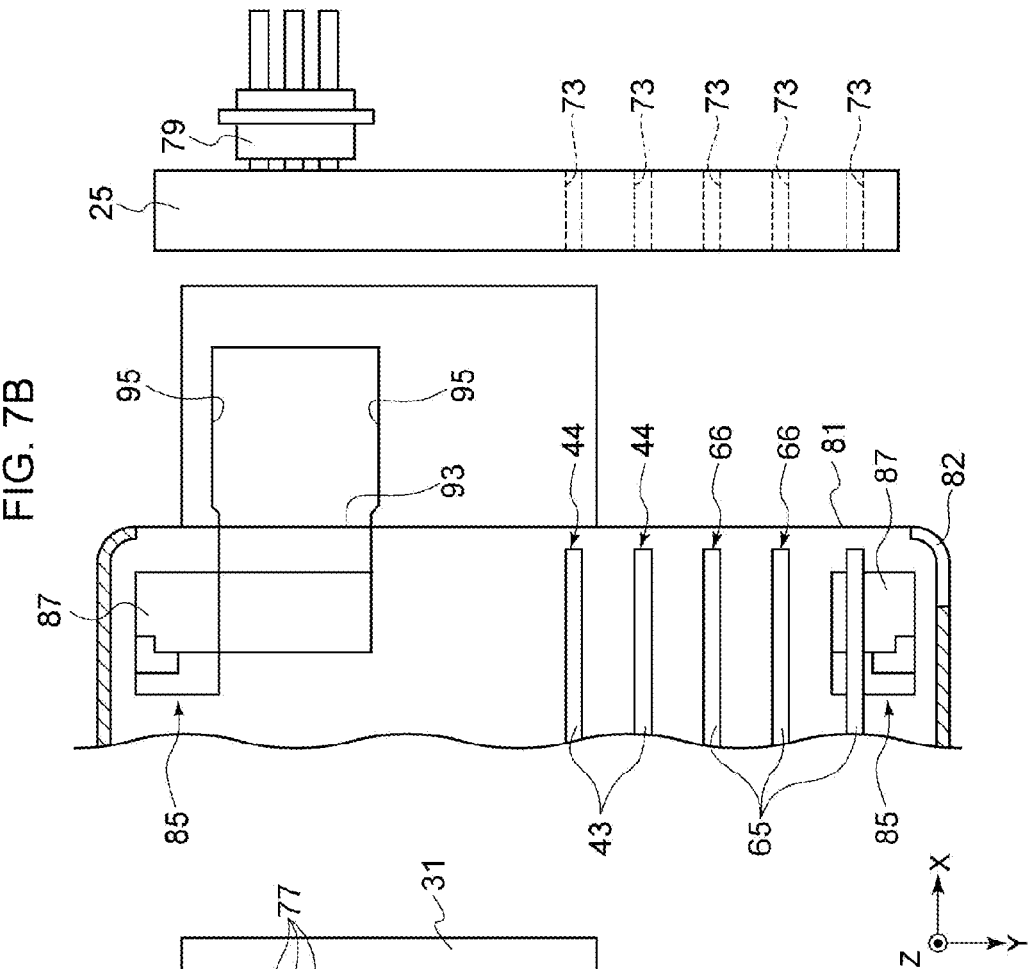

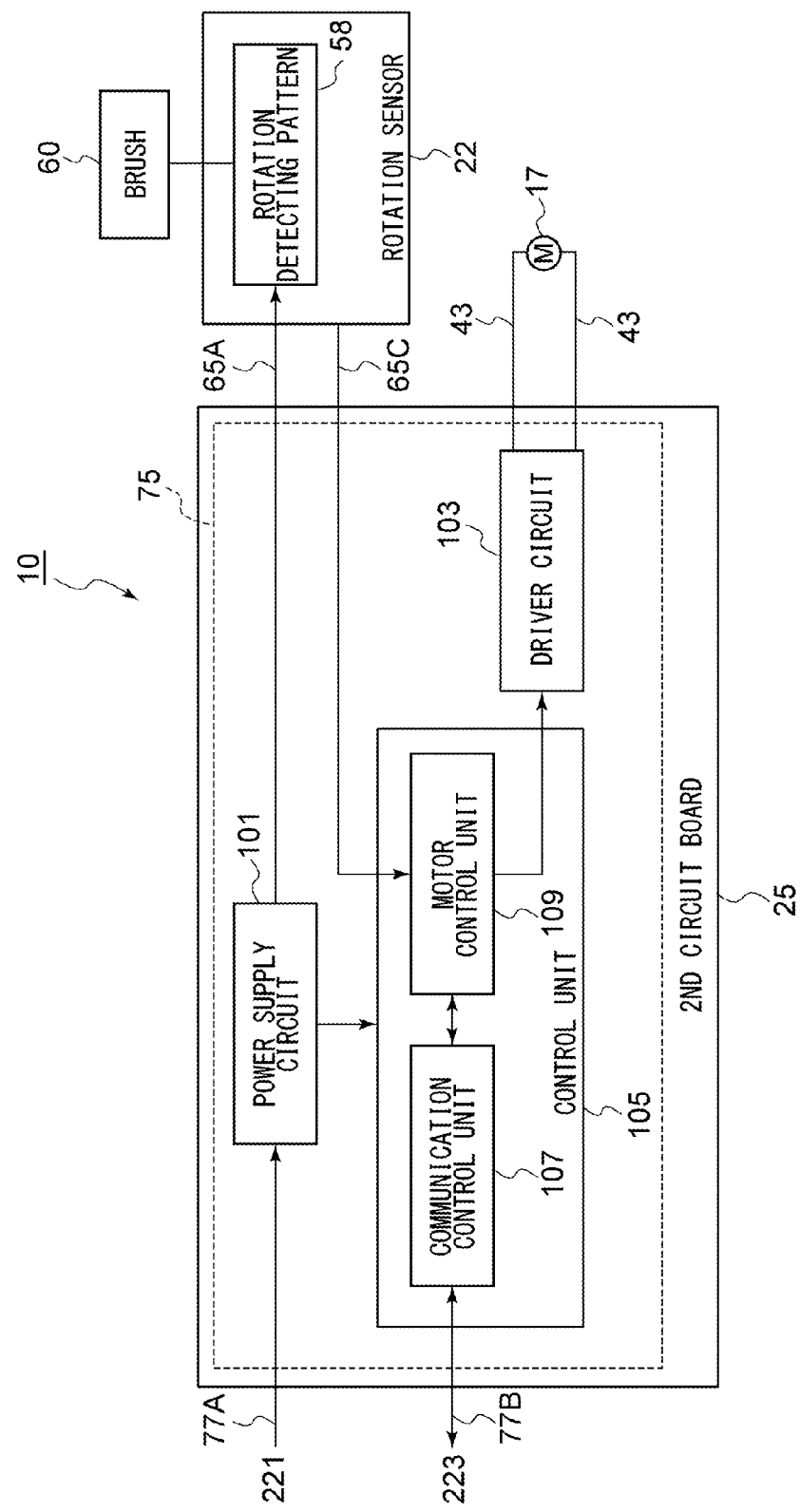

MOTOR ACTUATOR

CLAIM OF PRIORITY

This application claims priority to Japanese Patent Application No. 2014-105633, filed May 21, 2014, and is incorporated herein by reference.

BACKGROUND OF THE INVENTION

1. Field of the Invention

The present invention relates to a motor actuator used for an automotive air conditioning system and the like.

2. Description of the Related Art

In an automotive air conditioning system, a plurality of doors are provided midway in an air passage, through which air flows, and a driving motor actuator is attached to the door. The opening degree of the door is controlled by the motor actuator and thereby, for example, the quantity of air blowing into a vehicle's compartment (vehicle interior) is regulated. In this type of motor actuators, a potentiometer for detecting the rotational position of an output shaft is used for the purpose of controlling the rotational position thereof (see Reference (1) in the following Related Art List, for instance).

The potentiometer includes a rotation detection pattern, which is used to generate a detection signal indicating the rotational position of the output shaft, and a brush, which is in contact with the rotation detection pattern. In general, the rotation detection pattern is formed in a circuit board held within a housing, and the brush is so provided as to be rotatable integrally with an output gear of the output shaft. As the output shaft rotates, a contact position of the rotation detection pattern and the brush changes according to the rotational position of the output shaft. As a result, a detection signal in response to the rotational position of the output shaft is outputted from the rotation detection pattern.

RELATED ART LIST (1) Japanese Unexamined Patent Application Publication No. 2013-183554.

In an in-vehicle system such as the automotive air conditioning system, a plurality of motor actuators are controlled by an electronic control unit (ECU) in a unified manner. In this type of systems, there are cases where a serial communication such as a local interconnect network (LIN) is used for the purpose of reducing the number of electric wires used to connect the motor actuators. In this case, electronic components used to control the communication between the motor actuators and ECU need to be mounted on the motor actuators. In order to achieve this, the electronic components for controlling the communication are mounted on the aforementioned circuit board, in the conventional practice.

However, in the course of mounting the electronic components on the circuit board, the circuit board is generally subjected to a reflow process. The heat produced in the reflow process may change the resistance value of the rotation detection pattern and/or the position of the pattern, which in turn may possibly change the performance of the rotation detection pattern. A change in the performance may prevent the rotational position of the output shaft from being detected with accuracy. Also, if the change occurs in the resistance value thereof and/or the position of the pattern, an adjustment work must be done, thereby leading to an increase in overall cost.

SUMMARY OF THE INVENTION

The present embodiment has been made to solve such problems, and one of purposes thereof is to provide a motor actuator for which the performance change in a rotation detection pattern is suppressed, when electronic components for controlling the communication are to be mounted on a circuit board.

In order to resolve the aforementioned problems, a motor actuator according to one embodiment of the present invention includes: a housing; a motor contained in the housing; an output shaft that rotates together with rotation of a rotational shaft of the motor; and a rotation sensor and a circuit board that are contained in the housing, the rotation sensor including: a rotation detection pattern for generating a detection signal indicating a rotational position of the output shaft; and an output terminal capable of outputting the detection signal from the rotation detection pattern, wherein a terminal connection part to which the output terminal is connected is provided in the circuit board, and an electronic component including a communication control unit for controlling a communication with an external control apparatus is mounted on the circuit board.

By employing this embodiment, the rotation sensor, having the rotation detection pattern, and the circuit board, where the electronic components including the communication control unit are mounted, are separated from each other. Thus, carrying out the reflow process on the rotation sensor is no longer required and thereby the performance change in the rotation detection pattern is suppressed.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 7A is a plan view schematically showing a configuration of a circuit board holding portion of a lower-side casing according to a first embodiment;

FIG. 7B is a plan view showing a state when a second circuit board is placed in a circuit board holding portion;

FIG. 9 is a block diagram showing a regulatory system of a motor actuator according to a first embodiment;

DETAILED DESCRIPTION OF THE INVENTION

First Embodiment

Figure 1:
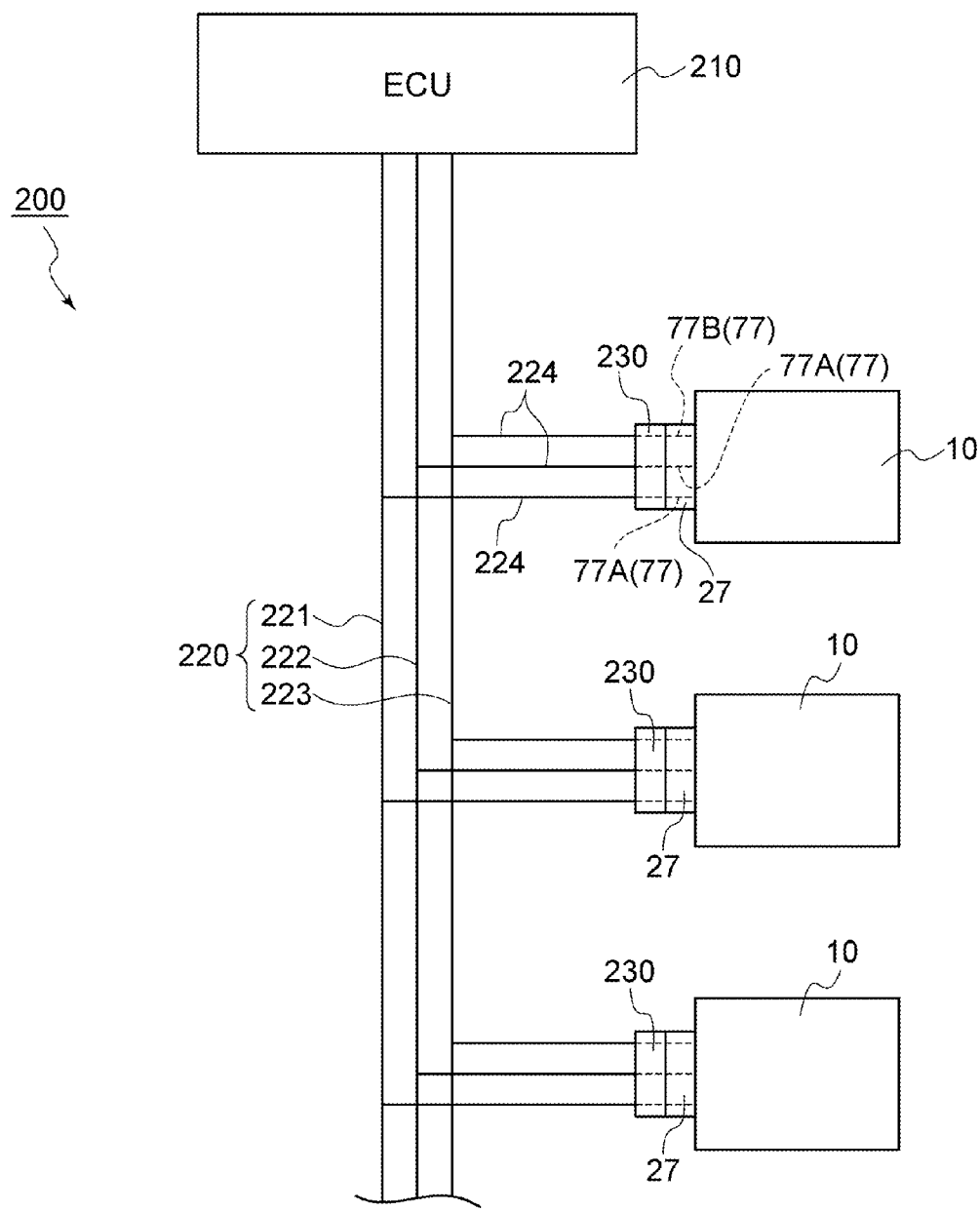
FIG. 1 is a block diagram showing a control system where motor actuators according to a first embodiment are used.

FIG. 1 is a block diagram showing a control system 200 where motor actuators 10 according to a first embodiment (hereinafter referred to as "actuator 10" or "actuators 10" also) are used.

The control system 200 is an automotive air conditioning system. The control system 200 includes a plurality of actuators 10 and an ECU (Electronic Control Unit) 210. Each actuator 10 is used to drive a door that opens and closes an air passage of an air conditioner. The ECU 210 is an external control apparatus for controlling an operation of each actuator 10 in the unified manner.

Each actuator 10 and the ECU 210 are connected by way of a wire harness 220. The wire harness 220 is configured by including a power line 221, a ground line 222 and a communication line 223. A plurality of external connectors 230 are connected to the wire harness 220 through electric wires 224 branched out from the respective lines 221, 222 and 223. A connector part 27, to which the external connector 230 is attached, is provided on each actuator 10.

Figure 2:
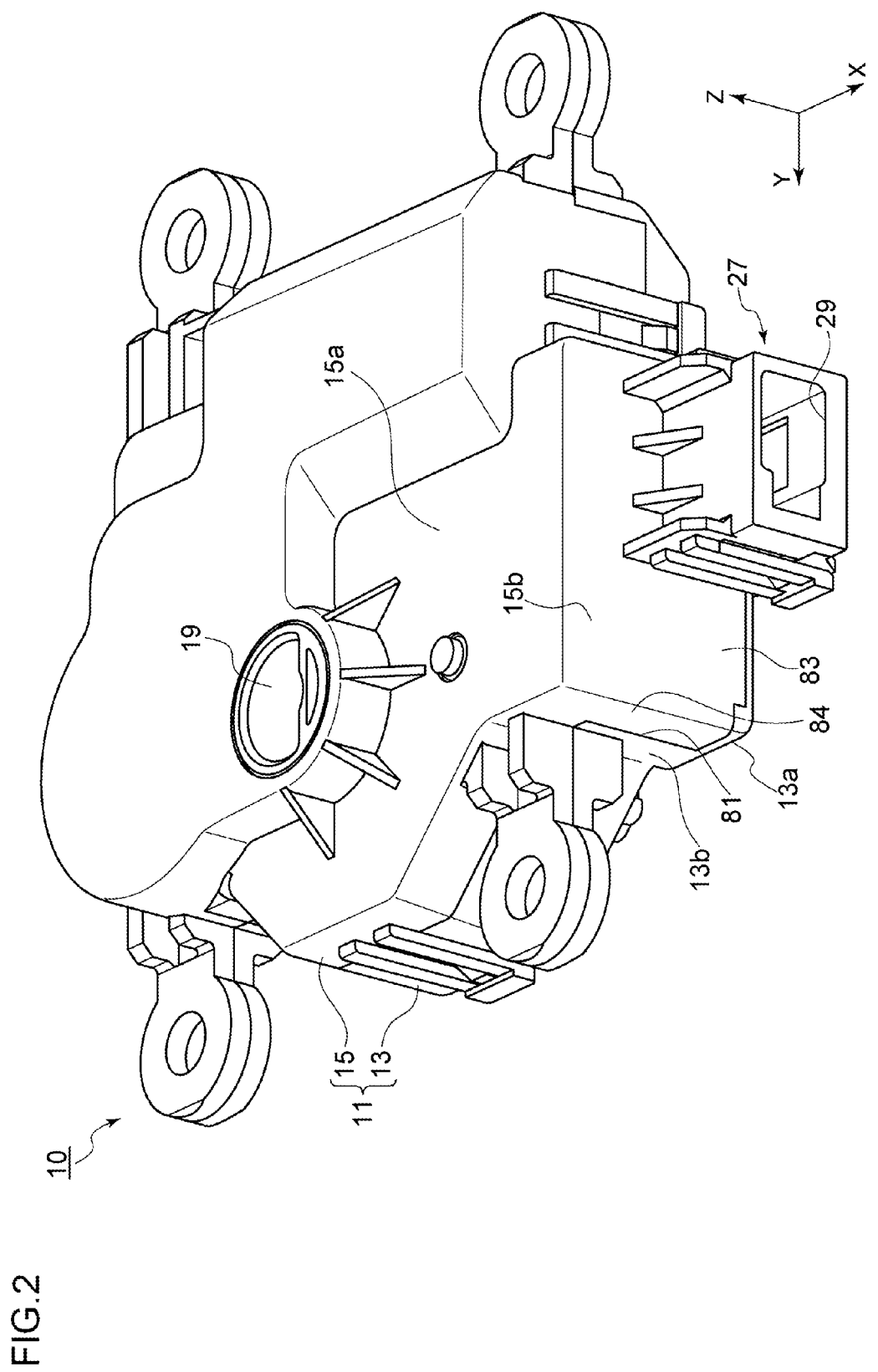
FIG. 2 is a perspective view showing the appearance of a motor actuator according to a first embodiment.

FIG. 2 is a perspective view showing the appearance of an actuator 10. The actuator 10 includes a housing 11 and an output shaft 19. Hereinafter, the directions mutually perpendicular in a plane perpendicular to the output shaft 19 are referred to as a front-back direction X and a horizontal direction Y, and the axial direction of the output shaft 19 is referred to as a height direction Z.

The housing 11 is formed of a resin material. The housing 11 contains internal parts and components that are a motor 17, a rotation sensor 22, a circuit board 25, all of which are described later, and so forth. The housing 11 is formed in a box-like shape and is configured such that a lower-side casing 13, which serves as a first casing, and an upper-side casing 15, which serves as a second casing, are assembled together. The lower-side casing 13 and the upper-side casing 15 are of a shape such that the housing 11 is divided in the axial direction Z of the output shaft 19.

The lower-side casing 13 includes a first bottom wall 13a and a first side wall 13b, which is formed upright toward the upper-side casing 15 from a lateral portion of the first bottom wall 13a. The upper-side casing 15 includes a second bottom wall 15a and a second side wall 15b, which is formed upright toward the lower-side casing 13 from a lateral portion of the second bottom wall 15a.

The connector part 27 is provided on the housing 11. The connector part 27 is formed in a cylindrical shape such that the connector part 27 extends along the front-back direction X, which is a direction away from the output shaft 19. A connector insertion inlet port 29, through which the external connector 230 (see FIG. 1) can be inserted, is open at a tip of the connector part 27.

Figure 3:
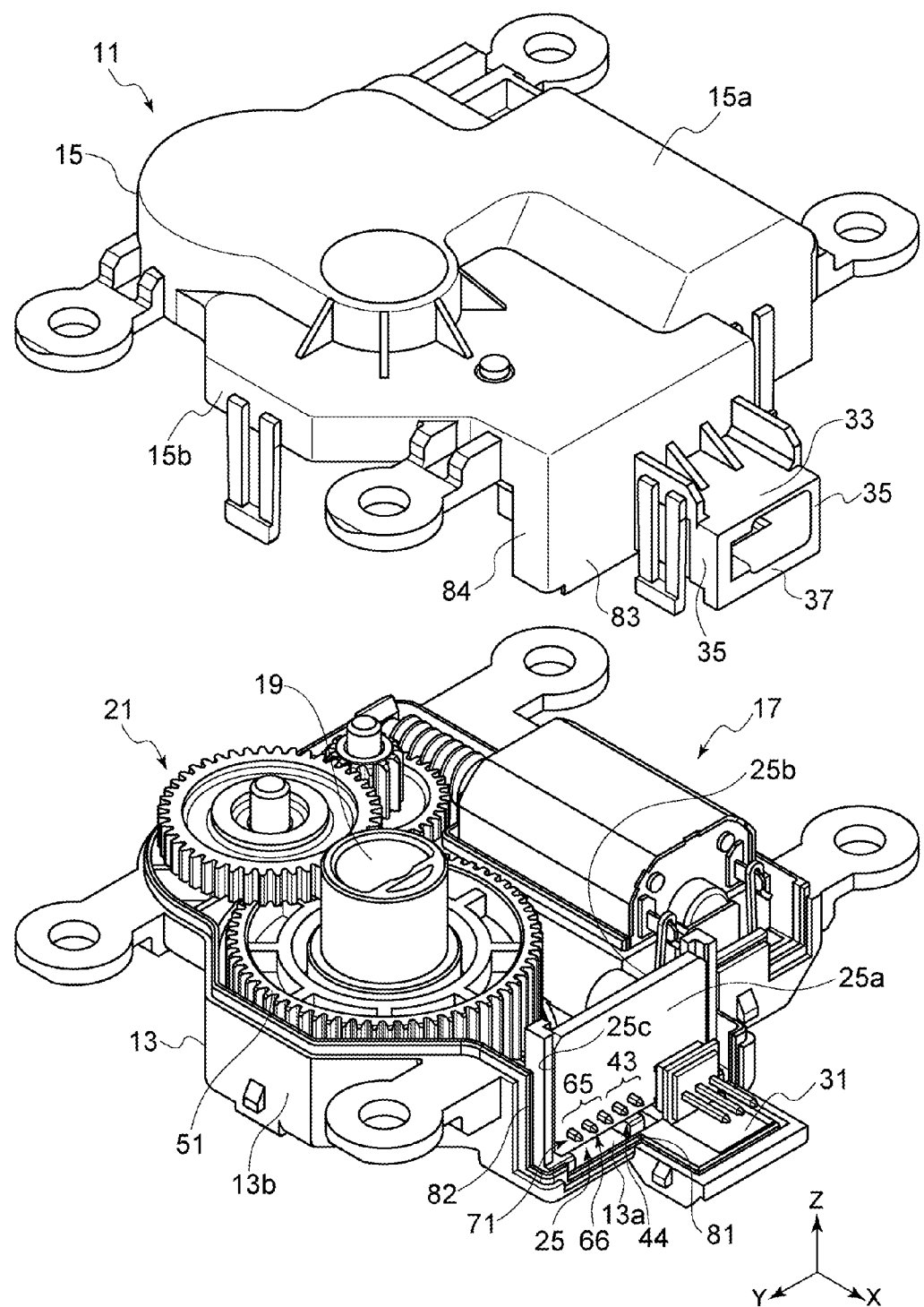
FIG. 3 is a perspective view of a motor actuator, according to a first embodiment, with an upper-side casing removed from a lower-side casing of a housing.

FIG. 3 is a perspective view of the actuator 10 with the upper-side casing 15 removed from the lower-side casing 13 of the housing 11. The actuator 10 further includes a motor 17, a reduction gear group 21, a rotation sensor 22 (not shown in FIG. 3), and a circuit board 25.

The connector part 27 includes a first bottom face part 31, which is provided in the lower-side casing 13, a ceiling face part 33, which is provided in the upper-side casing 15, a lateral face part 35, and a second bottom face part 37. The first bottom face part 31 does not have a lateral face part formed upright toward the upper-side casing 15 from a lateral portion of the first bottom face part 31. The ceiling face part 33 has a lateral face part 35 formed upright toward the lower-side casing 13 from a lateral portion of the ceiling face part 33. The second bottom face part 37 is not provided in a base end side of the connector part 27 but provided in a tip side of the connector part 27. In the base end side of the connector part 27, a cylindrical cross section is formed by the first bottom face part 31, the ceiling face part 33 and the lateral face part 35. In the tip side of the connector part 27, a cylindrical cross section is formed by the second bottom face part 37, the ceiling face part 33 and the lateral face part 35.

Figure 4:
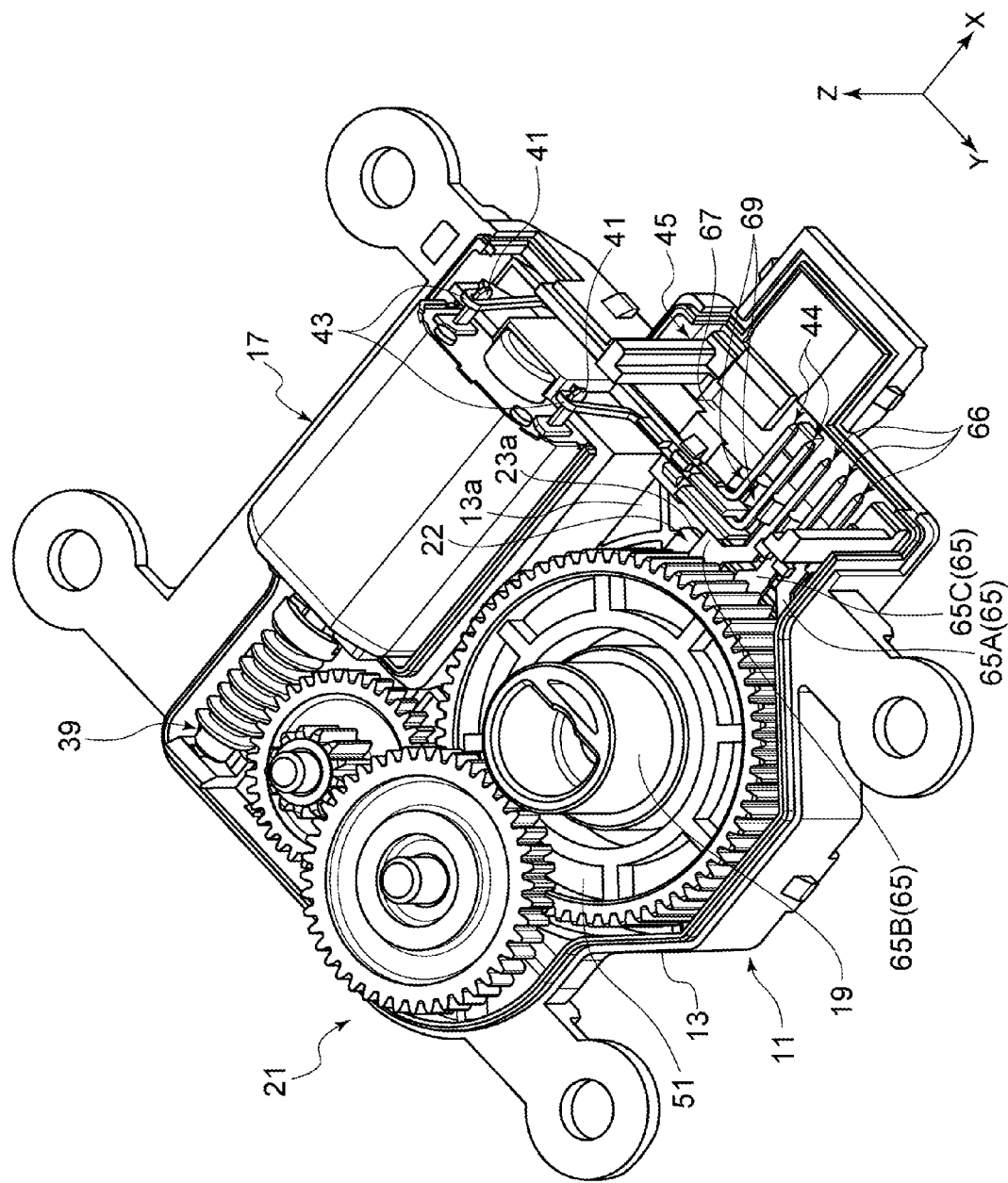
FIG. 4 is a perspective view of a motor actuator, according to a first embodiment, with a second circuit board removed from a lower-side casing.

FIG. 4 is a perspective view of the actuator 10 with the circuit board 25 removed from the state shown in FIG. 3. The motor 17 is configured such that a rotational shaft 39 protrudes from a front part of the motor 17 and such that a pair of motor terminals 41 protrude from a rear part thereof. A base end of a relay terminal 43 for the motor is connected to each of the motor terminals 41. Each relay terminal 43 is constituted by a metallic rod, which has undergone a forming processing.

The reduction gear group 21 includes an output gear 51. The output gear 51 is a gear in the final stage of the reduction gear group 21 and is so provided as to be rotatable integrally with the output shaft 19. The rotation sensor 22 is provided between the output gear 51 and the first bottom wall 13a of the lower-side casing 13. The reduction gear group 21 decelerates the rotation of the rotational shaft 39 of the motor 17 and transmits the thus decelerated rotation to the output shaft 19. The output shaft 19 rotates together with the rotation of the rotational shaft 39.

Figure 5:
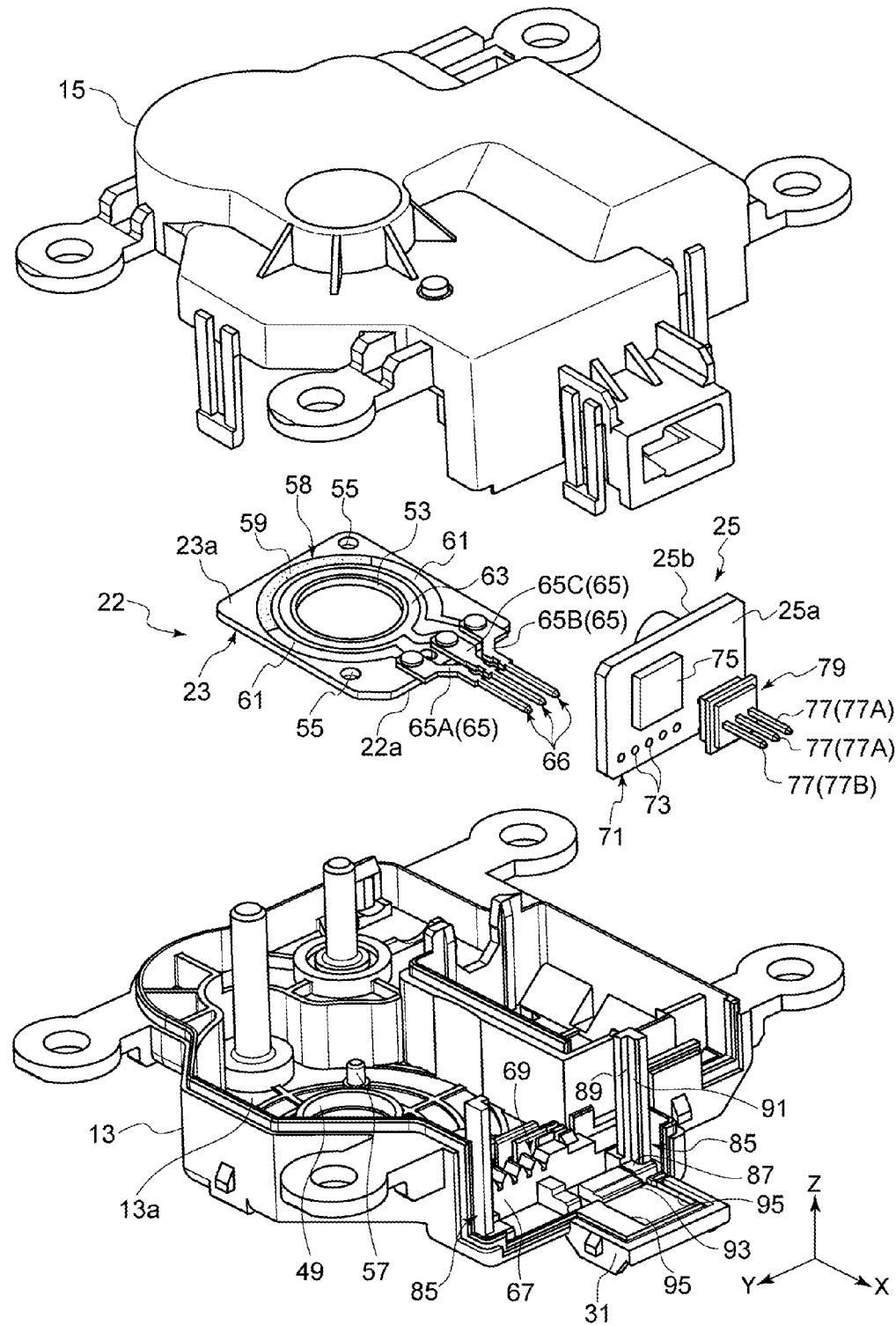
FIG. 5 is an exploded perspective view of a motor actuator according to a first embodiment.

FIG. 5 is an exploded perspective view of the actuator 10. The motor 17, the output shaft 19 and the reduction gear group 21 are omitted in FIG. 5. The output shaft 19 is freely rotatably supported in an output bearing 49 formed in the lower-side casing 13. The output bearing 49 is formed in a cylindrical shape such that the output bearing 49 protrudes inwardly from the first bottom wall 13a of the lower-side casing 13.

The rotation sensor 22 is configured by a circuit board 23 different from the circuit board 25. If, hereinafter, the distinction is to be made between the circuit boards 23 and 25, the circuit board 23 and the circuit board 25 will be referred to as a first circuit board 23 and a second circuit board 25, respectively. A fitting hole 53, through which the output shaft 19 penetrates in the axial direction Z of the output shaft 19, and a plurality of positioning holes 55 are formed in the rotation sensor 22. The output bearing 49 is fitted into the fitting hole 53. A plurality of pin-like raised portions 57 protruding inwardly are formed in the first bottom wall 13a of the lower-side casing 13. The raised portion 57 is inserted into each positioning hole 55 and thereby the rotation sensor 22 is positioned to the lower-side casing 13.

A rotation detection pattern 58, which is used to generate a detection signal indicating the rotational position of the output shaft 19, is formed on a surface of the first circuit board 23. The rotation detection pattern 58, which is constituted by an electric conductor, includes a resistor 59, a first conductive part 61, and a second conductive part 63. The resistor 59 is constituted by a resistive element having a large electric resistivity, and each of the conductive parts 61 and 63 is constituted by a copper foil or the like having an electric resistivity smaller than that of the resistor 59. The resistor 59 is formed in an arc shape on a circle concentric with the fitting hole 53. The first conductive part 61 is faulted in an arch shape on a circle concentric with the resistor 59 such that the first conductive part 61 connects to both ends of the resistor 59. The second conductive part 63 is formed in an annular shape, on a circle concentric with the fitting hole 53, in a position radially inward of the resistor 59.

A potentiometer is configured by combining the rotation sensor 22 with a brush (not shown in FIG. 5). The brush is mounted on a surface of the output gear 51 facing the first circuit board 23, and the brush is so provided as to be rotatable integrally with the output shaft 19. The brush is in contact with a pattern surface 23a of the first circuit board 23 on which the rotation detection pattern 58 is formed. More specifically, the brush is in contact with the resistor 59 and the second conductive part 63 of the rotation detection pattern 58.

A plurality of terminals 65 for use with the sensor are provided in the rotation sensor 22. Each terminal 65 is mounted on the first circuit board 23. The terminals 65 for use with the sensor include a power supply terminal 65A, a ground terminal 65B, and an output terminal 65C. The power supply terminal 65A and the ground terminal 65B are connected to the resistor 59 such that a voltage can be applied thereto. The output terminal 65C is connected to the second conductive part 63. The terminals 65A, 65B and 65C are arranged side by side to each other at a side edge 22a of the rotation sensor 22. A tip 66 of each of the terminals 65A, 65B and 65C is formed in a pin-like shape extending linearly in a direction away from the side edge 22a of the rotation sensor 22.

As will be described later, each terminal 65 for use with the sensor is electrically connected to the second circuit board 25. A first supply voltage (e.g., +5 V) is supplied to the power supply terminal 65A from a power supply circuit 101 described later, and then the first supply voltage is applied to the resistor 59 of the rotation detection pattern 58.

As the output shaft 19 rotates together with the output gear 51, the contact position of the rotation detection pattern 58 and the brush changes in the rotation sensor 22 according to the rotational position of the output gear 51. As a result, the resistance value between the power supply terminal 65A and the brush changes and thereby a voltage therebetween changes. The output terminal 65C outputs a voltage signal in response to the rotational position of the output shaft 19, as a detection signal, from the rotation detection pattern 58 to the second circuit board 25. The change in this detection signal is measured by a motor control unit 109 (described later) of the second circuit board 25, and the rotational position of the output shaft 19 is detected.

As shown in FIG. 4, a tip 44 of each of the relay terminals 43 for the motor is formed in a pin-like shape extending linearly in the direction away from the side edge 22a of the rotation sensor 22. The tips 44 of the relay terminals 43 for the motor as well as tips 66 of the terminals 65 for use with the sensor are arranged side by side to each other in the horizontal direction Y inside a circuit board holding portion 45 of the housing 11.

A protrusion wall 67, which protrudes toward the upper-side casing 15, is formed in the first bottom wall 13a of the lower-side casing 13, and a plurality of positioning grooves 69 are formed in the protrusion wall 67. The grooves 69 are formed such that the grooves 69 are spaced apart from each other in the direction Y, and each groove 69 extends along the tip 44 of each terminal 43 as well as the tip 66 of each terminal 65. The tip 44 of each terminal 43 and the tip 66 of each terminal 65 are placed inside the groove 69, and the tip 44 thereof and the tip 66 thereof is positioned to the lower-side casing 13.

Figure 6:
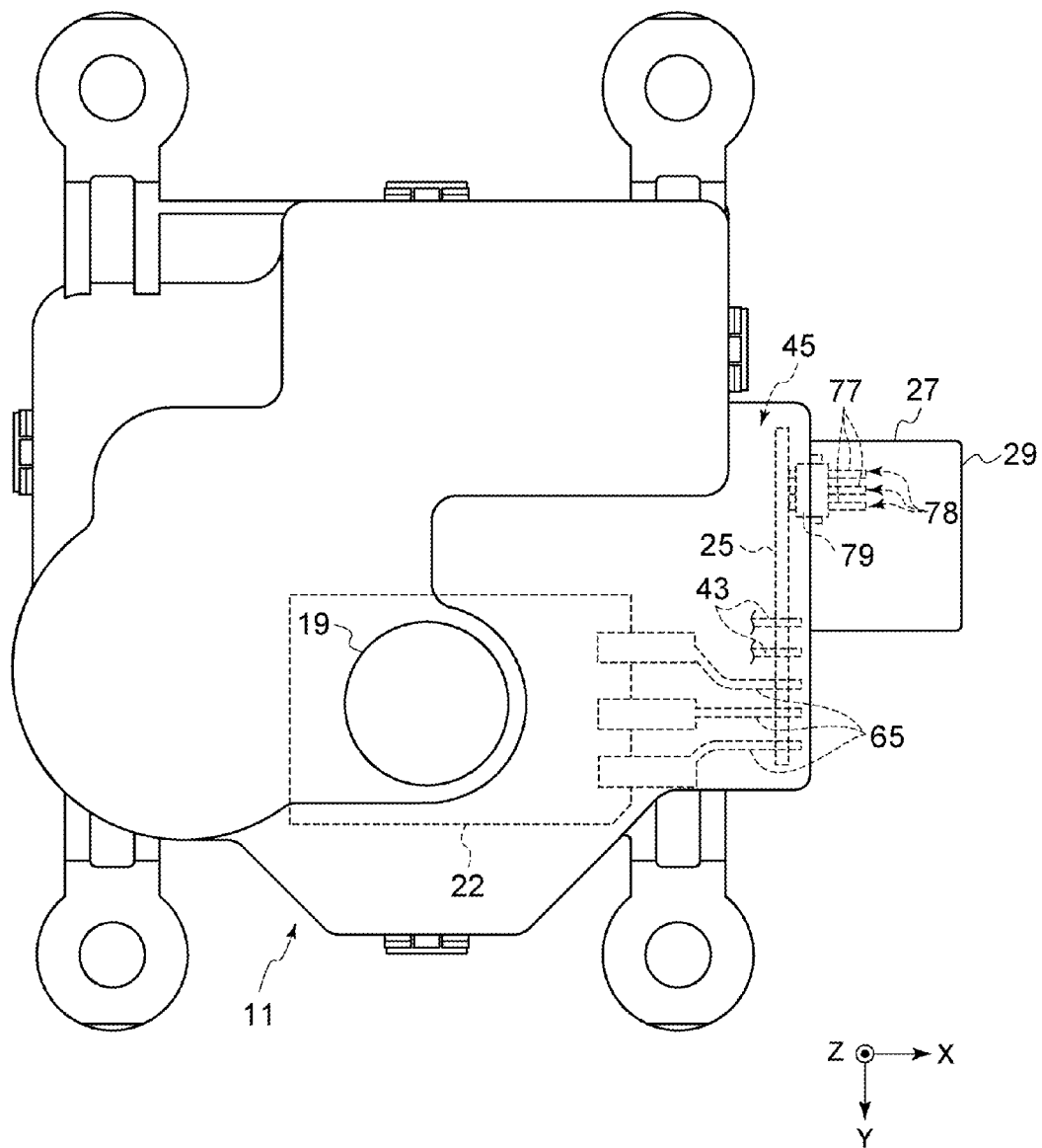
FIG. 6 is a plan view of a motor actuator according to a first embodiment.

FIG. 6 is a plan view of the motor actuator 10. In FIG. 6, the positions of the internal components such as the rotation sensor 22 are indicated by broken lines. The second circuit board 25 is contained in the circuit board holding portion 45 of the housing 11. The circuit board holding portion 45 is formed between the rotation sensor 22 and the connector part 27. The second circuit board 25 is arranged between the rotation sensor 22 and the connector part 27. The second circuit board 25 is contained in the circuit board holding portion 45 such that the second circuit board 25 is parallel with the axial direction (the height direction Z) of the output shaft 19. The second circuit board 25 is contained therein such that the second circuit board 25 is perpendicular to the first circuit board 23.

As shown in FIG. 3 and FIG. 5, a terminal connection part 71, to which the relay terminals 43 for the motor and the terminals 65 for use with the sensor are connected, is provided in the second circuit board 25. The terminal connection part 71 is provided near one of lateral side surfaces 25c on the both sides of the second circuit board 25 in the horizontal direction Y thereof. The terminal connection part 71 has a plurality of terminal holes 73 through which the tips 44 of the terminals 43 and the tips 66 of the terminals 65 are inserted. The terminal holes 73 are formed at intervals in the horizontal direction Y where the tips 44 and 66 of the terminals 43 and 65 are arranged side by side. The tips 44 of the terminals 43 and the tips 66 of the terminals 65 each protrudes from the terminal hole 73 and are connected, by solders (not shown), to wiring patterns (not shown) of the second circuit board 25. The wiring patterns are formed on an outer surface 25a of the second circuit board 25, which is a side thereof where the tips 44 and 66 of the terminals 43 and 65 protrude, and an inner surface 25b thereof, which is a side opposite to the outer surface 25a.

As shown in FIG. 5, a plurality of connector terminals 77 are mounted on the outer surface 25a of the second circuit board 25. The connector terminals 77 include a pair of power-feeding terminals 77A and a signal transmission terminal 77B. A base end section (not shown) of each connector terminal 77 is connected to the wiring pattern of the second circuit board 25. The connector terminals 77 are arranged side by side at intervals in the horizontal direction Y, and the positions of the connector terminals 77 closer to the base end section thereof are held by a header housing 79 made of resin. A tip 78 of each connector terminal 77 is arranged inside the connector part 27 and is formed in a pin-like shape extending linearly toward the connector insertion inlet port 29 (see FIG. 6).

An IC chip 75 is mounted, on the outer surface 25a of the second circuit board 25, as an electronic component including a communication control unit 107 (described later). The IC chip 75 is connected to each of the terminals 43, 65 and 77 via the wiring pattern.

As shown in FIG. 1, when the external connectors 230 are connected to the connector parts 27, the connector terminals 77 are respectively connected to the lines 221, 222 and 223 of the wire harness 220 through the external connector 230 and the electric wires 224. The pair of power-feeding terminals 77A are connected to the power line 221 and the ground line 222 of the wire harness 220, whereas the signal transmission terminal 77B is connected to the communication line 223.

FIG. 7A is a plan view schematically showing a configuration of the circuit board holding portion 45 of the lower-side casing 13. FIG. 7B is a plan view showing a state when the second circuit board 25 is placed in the circuit board holding portion 45. On the first side wall 13b of the lower-side casing 13, a circuit board insertion part 81 is formed in a position opposite to the outer surface 25a of the second circuit board 25. The circuit board insertion part 81 is constituted by a notch formed in the first side wall 13b of the lower-side casing 13 (see FIG. 3). The circuit board insertion part 81 is formed in a size such that the second circuit board 25 can be inserted into the inside from the outside of the lower-side casing 13. Also, on the first side wall 13b of the lower-side casing 13, a notch (cutout) 82 is formed in a position facing one of the lateral side surfaces 25c of the second circuit board 25. Here, "one of the lateral side surfaces 25c" is a lateral side surface 25c of the two lateral side surfaces 25c on the both sides of the second circuit board 25 in the horizontal direction Y and is the lateral side surface 25c located near the terminal connection part 71.

Note that, as described earlier, a lateral face part formed upright from the first bottom face part 31 is not provided in the connector part 27. Thus, when the second circuit board 25 is to be inserted through the circuit board insertion part 81, the interference otherwise caused by coming into contact with the second circuit board 25 is suppressed or prevented. In other words, the connector part 27 is of a shape such that when the second circuit board 25 is inserted, the second circuit board 25 can be inserted without interfering with such a lateral face part coming into contact with the second circuit board 25.

As shown in FIG. 2 and FIG. 3, a first lid part 83, which covers the circuit board insertion part 81, is formed, in the second side wall 15b of the upper-side casing 15, in a position corresponding to the circuit board insertion part 81 of the lower-side casing 13. The first lid part 83 is formed, in the second side wall 15b of the upper-side casing 15, in a position opposite to the outer surface 25a of the second circuit board 25. Also, a second lid part 84, which covers the notch 82, is formed, in the second side wall 15b of the upper-side casing 15, in a position corresponding to the notch 82 of the lower-side casing 13. The second lid part 84 is formed, in the second side wall 15b of the upper-side casing 15, in a position opposite to one of the lateral side surfaces 25c. Each of the first and second lid parts 83 and 84 is formed such that the height dimension thereof extending toward the lower-side casing 13 is larger than the dimensions of other parts of the second side wall 15b of the upper-side casing 15.

As shown in FIG. 5 and FIGS. 7A and 7B, a plurality of extensions (projections) 85, which protrude toward the upper-side casing 15, are formed on the first bottom wall 13a of the lower-side casing 13. The extensions 85 are formed such that the extensions 85 are spaced apart from each other in the horizontal direction Y. A placement surface 87, on which the second circuit board 25 is placed, is formed on each extension 85. First engaging surfaces 89, which are disposed opposite to the inner surface 25b of the second circuit board 25, are formed on the extensions 85. Should the second circuit board 25 fall to an inner surface 25b side, the second circuit board 25 will come into contact with the first engaging surface 89, thereby preventing the second circuit board 25 from falling. Also, second engaging surfaces 91, which face the lateral side surfaces 25c of the second circuit board 25 in the horizontal direction Y, are formed on the extensions 85. Since the second engaging surfaces 91 are in contact with the lateral side surfaces 25c, a positional displacement of the second circuit board 25 in the horizontal direction Y is prevented.

A first positioning part 93 of a stepped shape protruding toward the upper-side casing 15 is formed between the first bottom wall 13a of the lower-side casing 13 and the first bottom face part 31 of the connector part 27. The first positioning part 93 is so formed as to extend along the horizontal direction Y. A second positioning part 95 of a stepped shape protruding toward the upper-side casing 15 is formed on the first bottom face part 31 of the connector part 27. The second positioning parts 95 are spaced apart from each other in the horizontal direction Y, and are so formed as to extend along the front-back direction X. In each of the second positioning part 95, a guide part 96, which is tilted toward the base end side of the connector part 27 such that the width thereof is gradually narrowed down in the horizontal direction Y, is formed in a midway position from the tip side toward the base end side of the connector part 27.

When the second circuit board 25 is placed inside the circuit board holding portion 45, the header housing 79 of the second circuit board 25 is positioned to the lower-side casing 13 in the front-back direction X through an engagement state of the header housing 79 with the first positioning part 93. At this time, formation of the guide parts 96 enables the second circuit board 25 to be smoothly guided when the second circuit board 25 is moved toward the base end side of the connector part 27. As a result, the workability at the time of positioning is excellent. Also, the header housing 79 is positioned to the lower-side casing 13 in the horizontal direction Y through an engagement state of the header housing 79 with the second positioning parts 95. Note here that the front-back direction X agrees with a direction I where the tip 66 of each terminal 65 for use with the sensor extends from the terminal hole 73, and the horizontal direction Y agrees with a direction perpendicular to this direction I.

Figure 8A:
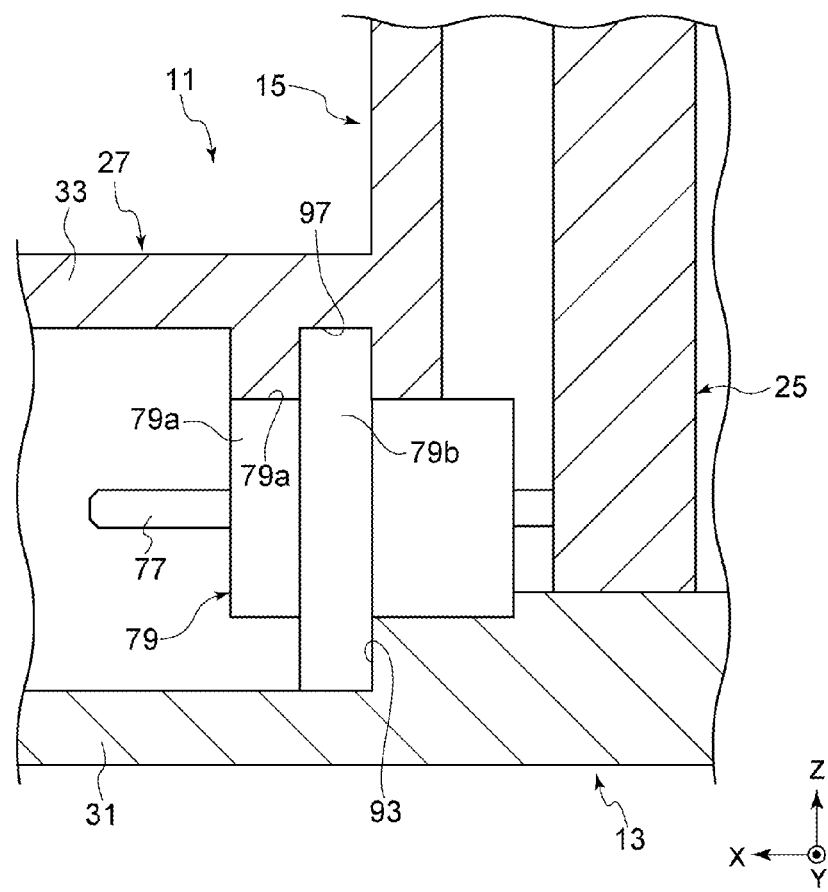
FIG. 8A is a partial cross-sectional view of a header housing, according to a first embodiment, as viewed from a directional axis along the horizontal direction.
Figure 8B:
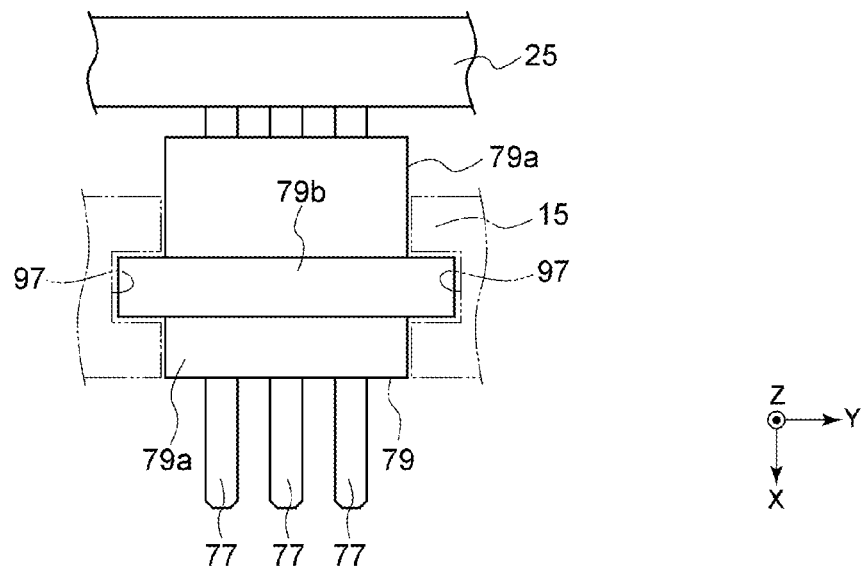
FIG. 8B shows a configuration thereof as viewed from a directional axis along the height direction.

FIG. 8A is a partial cross-sectional view of the header housing 79 as viewed from a directional axis along the horizontal direction Y. FIG. 8B shows a configuration thereof as viewed from a directional axis along the height direction Z. A protrusion 79b, which extends both in the horizontal direction Y and the height direction Z, is formed in a side wall 79a of the header housing 79. The upper-side casing 15 has a first position holding section 97 that holds the protrusion 79b of the header housing 79. The first position holding section 97 is formed in a groove shape extending along a direction where the protrusion 79b extends, and is provided on both sides of the header housing 79 in the horizontal direction Y and on one side thereof in the height direction Z (upper side in FIG. 8A). When the upper-side casing 15 is assembled to the lower-side casing 13, the protrusion 79b of the header housing 79 is placed inside the first position holding section 97. An engagement state of the protrusion 79b with the first position holding section 97 restricts the movement of the header housing 79 in the front-back direction X, which is the direction where the connector part 27 extends. Thereby, the protrusion 79b on both sides of the header housing 79 in the horizontal direction Y and on one side thereof in the height direction Z is held in the housing 11. As a result, the positional displacement of each connector terminal 77 can be prevented when the external connector 230 is attached/detached to/from the connector part 27.

Though not shown in FIGS. 8A and 8B, the second circuit board 25 is held by and between the lower-side casing 13 and the upper-side casing 15 in order to secure the vibration resistance.

FIG. 9 is a block diagram showing a regulatory system of the actuator 10. The second circuit board 25 includes a power supply circuit 101, a driver circuit 103, and a control unit 105. The control unit 105 is achieved hardwarewise by elements such as a CPU and memories. And the control unit 105 has a communication control unit 107 and a motor control unit 109. These components are built into a single IC chip 75.

The electric power is supplied to the power supply circuit 101 from the ECU 210 through the power line 221 and the power-feeding terminals 77A. Upon receiving this electric power, the power supply circuit 101 generates a first supply voltage and a second supply voltage. The first supply voltage is supplied to the rotation detection pattern 58 via the power supply terminal 65A of the rotation sensor 22. In the rotation sensor 22, the contact position of the rotation detection pattern 58 and a brush 60 changes according to the rotational position of the output shaft 19, and a detection signal in response to the rotational position thereof is outputted to the motor control unit 109 through the output terminal 65C. The second supply voltage is supplied to the control unit 105 and then the control unit 105 operates based on the second supply voltage.

The communication control unit 107 controls the communications carried out between the actuator 10 and the ECU 210 via the communication line 223 and the signal transmission terminal 77B. The communication control unit 107 carries out the serial communication using the single communication line 223, in accordance with a predetermined protocol (e.g., LIN).

The motor control unit 109 controls the operation of the motor 17, based on a control signal sent from the ECU 210. In this control, a drive signal for the driver circuit 103 is generated and the thus generated drive signal is outputted to the driver circuit 103. The driver circuit 103 generates a drive voltage, based on the drive signal sent from the motor control unit 109. The driver circuit 103 supplies the thus generated drive voltage to the motor 17 via the relay terminals 43 for the motor so as to drive the motor 17.

A description is now given of an exemplary method for assembling the above-described actuator 10.

First, the rotation sensor 22 is assembled inside the lower-side casing 13. As shown in FIG. 5, the rotation sensor 22 is positioned to the lower-side casing 13 in a manner such that the output bearing 49 of the lower-side casing 13 is fitted inside the fitting hole 53 and such that the raised portions 57 are inserted respectively into the positioning holes 55. At this time, the tips 66 of the terminals 65, for use with the sensor, in the rotation sensor 22 are arranged inside the positioning grooves 69 of the lower-side casing 13, and the tips 66 thereof are also positioned to the lower-side casing 13.

Then, the reduction gear group 21 and the motor 17 are assembled inside the lower-side casing 13. At this time, as shown in FIG. 4, the tips 44 of the relay terminal 43, for the motor, in the motor 17 are arranged inside the positioning grooves 69 of the lower-side casing 13, and the tips 44 thereof are also positioned to the lower-side casing 13. Since the rotation sensor 22 is positioned to the lower-side casing 13, the brush mounted on the output gear 51 is accurately abutted against the rotation detection pattern 58 of the rotation sensor 22 when the output shaft 19 and the output gear 51 are simultaneously assembled.

Then, the second circuit board 25 is assembled inside the lower-side casing 13. As shown in FIG. 7B, the second circuit board 25 is inserted into the inside from the outside through the circuit board insertion part 81 in a manner such that the tips 44 of the relay terminals 43 for the motor and the tips 66 of the terminals 65 for use with the sensor are inserted into the terminal holes 73. At this time, the second circuit board 25 has the header housing 79 engaged with the first positioning part 93 and the second positioning parts 95 of the lower-side casing 13, and is positioned to the lower-side casing 13 in the front-back direction X and in the horizontal direction Y.

Then, the tips 44 of the terminals 43 and the tips 66 of the terminals 65, which protrude from the terminal holes 73 of the second circuit board 25, are connected to the wiring pattern of the second circuit board 25 by using the solders. Then, the lower-side casing 13 is assembled to the upper-side casing 15. This completes the assembly of the actuator 10.

According to the above-described actuator 10, the rotation sensor 22, having the rotation detection pattern 58, and the second circuit board 25, where the IC chip including the communication control unit 107, are separated from each other. This eliminates the need of the reflow process performed on the rotation sensor 22. Thus, the rotation detection pattern 58 of the rotation sensor 22 will not be subjected to the influence of heat generated during the reflow process, and the occurrence of change in the resistance value and/or the position of the pattern otherwise caused by the heat is suppressed. Hence, the performance change in the rotation detection pattern 58 is suppressed. Also, since the change in the resistance value and/or the position of the rotation detection pattern 58 does not occur, the adjustment work is no longer required and therefore the increase of cost required by the adjustment work is suppressed.

Of the internal parts used in the actuator 10, the motor 17, the reduction gear group 21, the rotation sensor 22 and the relay terminals 43 for the motor can be commonly used with the ready-made parts used in an actuator where the serial communication like LIN is not used. This common use of the parts and components suppresses the number of exclusive-use parts and suppress the increase of cost associated with the manufacturing and management.

As shown in FIG. 6, the second circuit board 25 is contained in the housing 11 such that the second circuit board 25 is parallel with the axial direction of the output shaft 19. This configuration and arrangement reduce the dimensions of the second circuit board 25 in the front-back direction X, which is a direction perpendicular to the axial direction of the output shaft 19. Thus, the dimensions of the housing 11 in the front-back direction X are suppressed to possible minimum, so that the housing 11 can be downsized.

Also, the second circuit board 25 is arranged between the rotation sensor 22 and the connector part 27. This configuration and arrangement enable the length of each of the terminals 43, 65 and 77 in between the rotation sensor 22 and the connector part 27 to be more likely to be suppressed to the minimum, so that the housing 11 can be downsized.

Also, since the circuit board insertion part 81, through which the second circuit board 25 can be inserted, is formed on the first side wall 13b of the lower-side casing 13, the following advantageous effects are achieved. The variation, if any, in the contact position of the rotation detection pattern 58 and the brush causes adverse effects on the detection result of the rotation sensor 22. For this reason, the rotation sensor 22 needs to be accurately positioned to the lower-side casing 13. Also, the variation, if any, in the positions of the connector terminals 77 may possibly cause a contact failure between the connector terminals 77 and the external connector 230. For this reason, the second circuit board 25 needs to be accurately positioned to the lower-side casing 13. In other words, the rotation sensor 22 and the second circuit board 25 (hereinafter referred to as "the rotation sensor 22 and the like" also) need to be respectively positioned to the lower-side casing 13 with accuracy.

Suppose herein that the rotation sensor 22 and the like are each connected by using the solders before they are assembled inside the lower-side casing 13. Then, a shift or displacement will occur in a relative position of the rotation sensor 22 and the like and consequently the rotation sensor 22 and the like cannot be accurately positioned to the lower-side casing 13, unless both the rotation sensor 22 and the second circuit board 25 are each connected in a state where both of them are accurately positioned. However, high is the difficulty level of working and achieving to accurately position the rotation sensor 22 and the like before they are assembled inside the lower-side casing 13, thereby making it difficult to ensure the quality of a product.

In this regard, the circuit board insertion part 81 is formed in the housing 11 according to the present embodiment, so that the second circuit board 25 can be assembled after the rotation sensor 22 is assembled inside the lower-side casing 13. This reduces the difficulty level of working than when the rotation sensor 22 and the like are simultaneously assembled to the lower-side casing 13, thus making it easier to ensure the quality of the product. In particular, the first positioning part 93 and the second positioning parts 95 are formed in the lower-side casing 13 and therefore the workability at the time when the second circuit board 25 is positioned to the lower-side casing 13 is excellent.

Also, the first lid part 83, which covers the circuit board insertion part 81 of the lower-side casing 13, is formed, in the second side wall 15b of the upper-side casing 15. Thus, the tips 44 of the relay terminals 43 for the motor and the tips 66 of the terminals 65 for use with the sensor can be protected by the first lid part 83.

Second Embodiment

Figure 10:
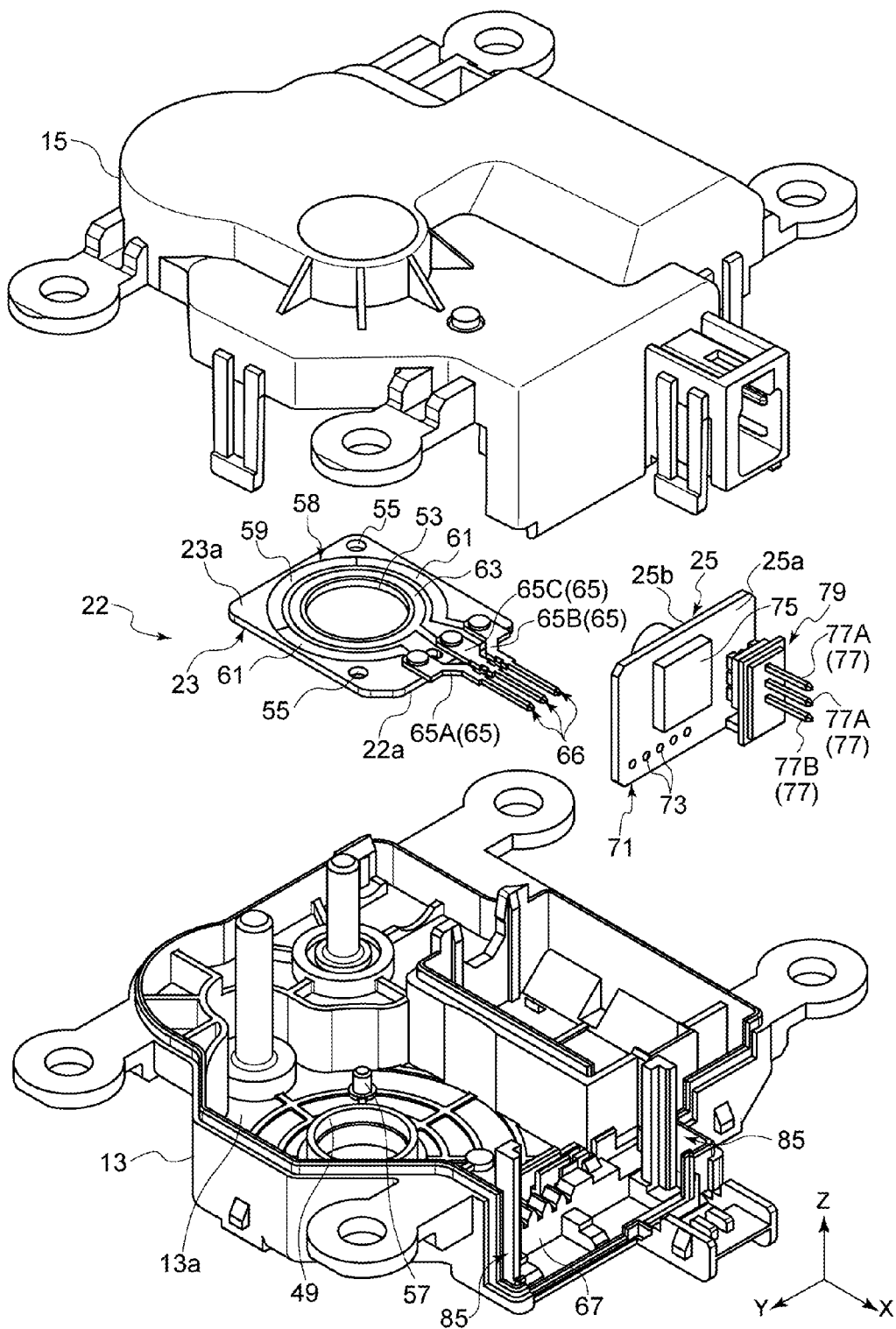
FIG. 10 is a exploded perspective view of a motor actuator according to a second embodiment.

FIG. 10 is a exploded perspective view of an actuator 10 according to a second embodiment. The components of the actuator 10, according to the second embodiment, identical to those explained in the first embodiment are given the identical reference numerals used in the first embodiment and the repeated description thereof will be omitted here.

A plurality of connector terminals 77 are arranged side by side in the height direction Z, instead of the horizontal direction Y. This height direction Z is a direction parallel with the second circuit board 25 and perpendicular to the horizontal direction Y away from the terminal holes 73. In this configuration and arrangement, the distance between each connector terminal 77 and the terminal holes 73 is set farther than when each connector terminal 77 are arranged side by side in the horizontal direction Y. Thus, when the tip 66 of each terminal 65 for use with the sensor is to be soldered, more space is allowed for the tip of a soldering iron to freely move around. This prevents the resin located near this space from being melted as a result of the soldering iron tip otherwise coming into contact with the resin or the radiation heat from the soldering iron tip.

Third Embodiment

Figure 11:
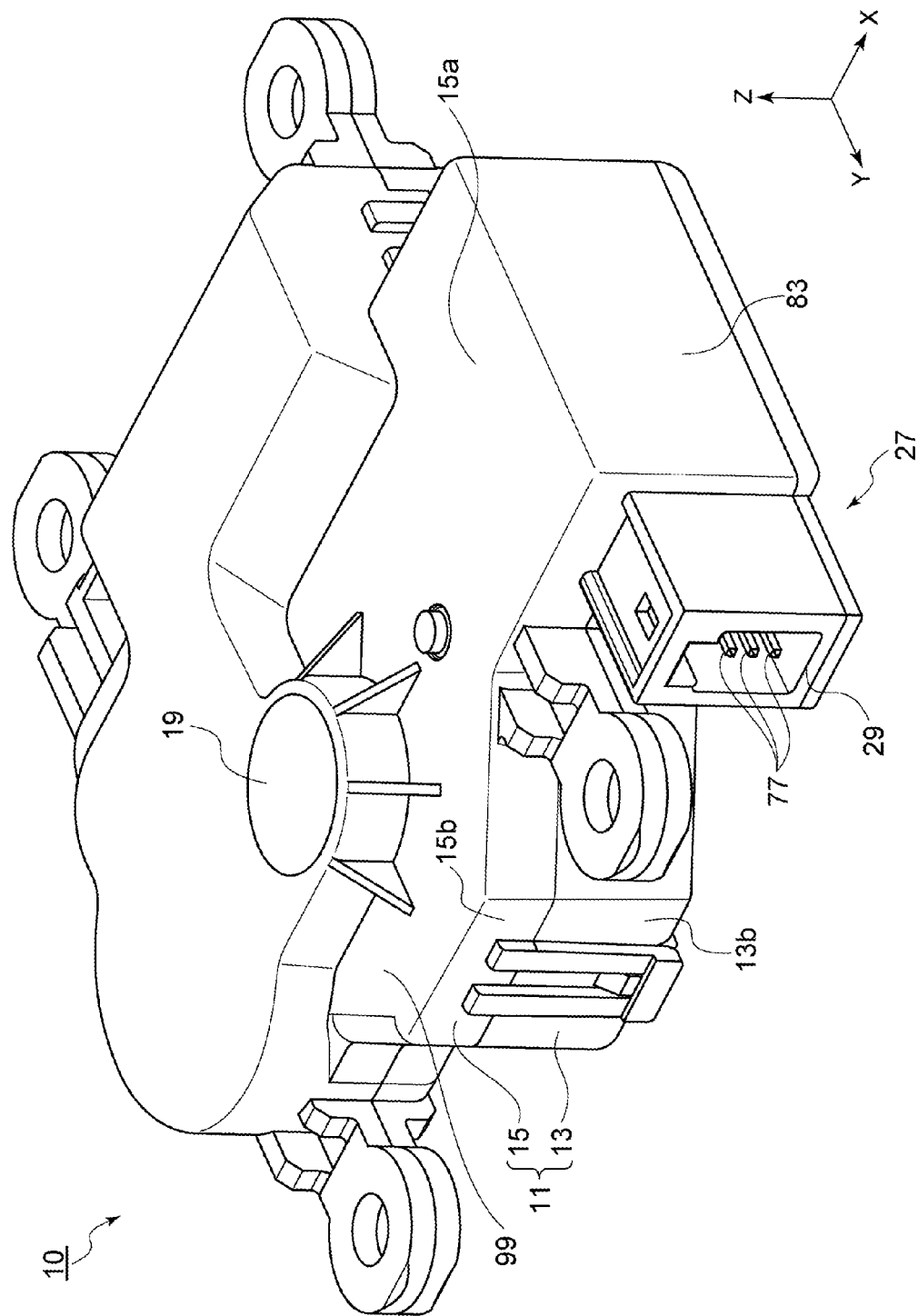
FIG. 11 is a perspective view showing the appearance of a motor actuator according to a third embodiment.
Figure 12:
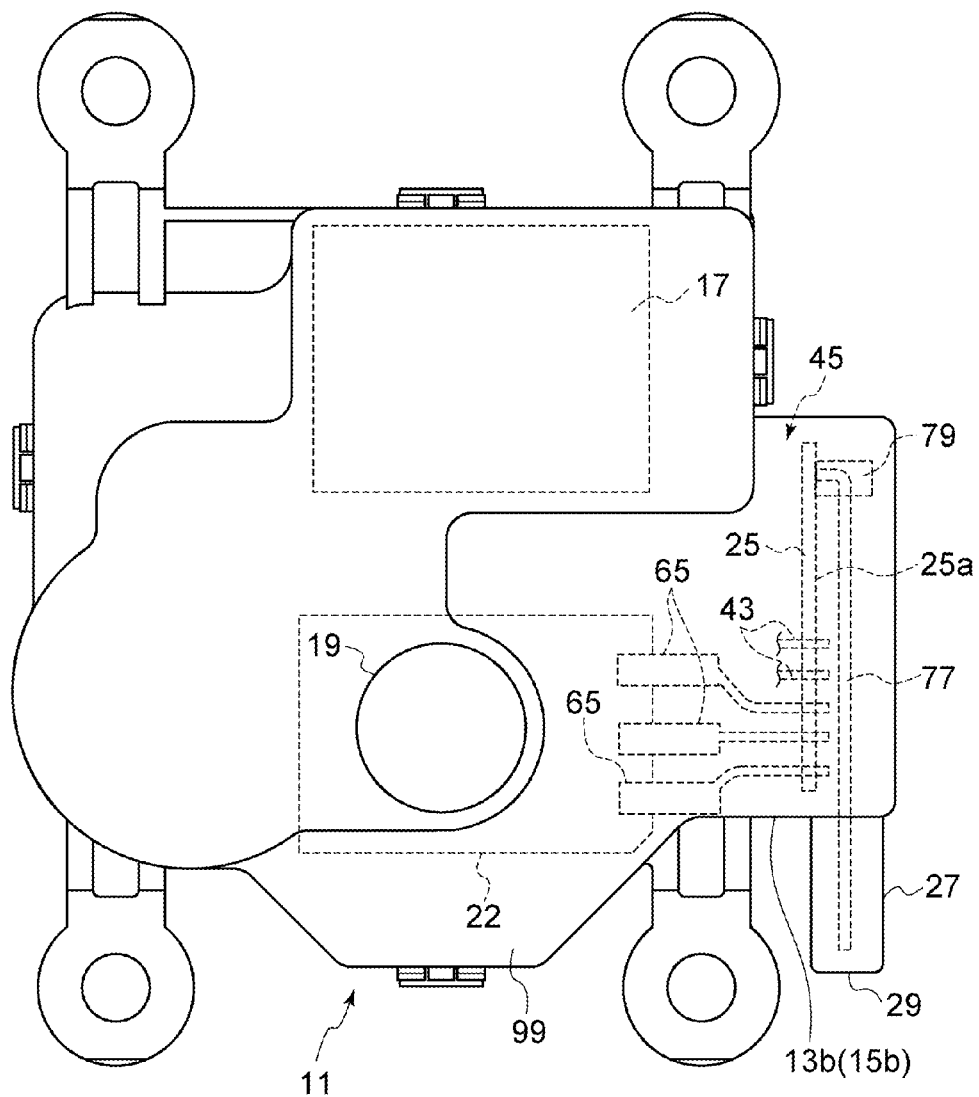
FIG. 12 is a plan view of a motor actuator according to a third embodiment.

FIG. 11 is a perspective view showing the appearance of an actuator 10 according to a third embodiment. FIG. 12 is a plan view of the actuator 10 actuator according to the third embodiment. In the housing 11, a bulging portion 99 is formed on a first side wall 13b and a second side wall 15b, which are disposed opposite to the motor 17 in relation to the output shaft 19. The bulging portion 99 is formed such that the first side wall 13b and the second side wall 15b are each bulged outward, and part of the output gear 51 (not shown) is contained inside the bulging portion 99. The circuit board holding portion 45 of the housing 11 is formed in a position away from the output shaft 19 in the front-back direction X perpendicular to the horizontal direction Y, which is a direction where the bulging portion 99 is bulged outward.

The connector part 27 of the housing 11 is so formed as to extend along the horizontal direction Y, which is a direction parallel with the second circuit board 25, on an outer surface 25a side of the second circuit board 25. And the connector insertion inlet port 29 is formed on a tip side of the connector part 27. The connector part 27 is so formed as to extend along the same horizontal direction Y as the direction where the bulging portion 99 is bulged outward.

Similar to the second embodiment, a plurality of connector terminals 77 are arranged side by side in the height direction Z. Each connector terminal 77 has a bent part at its intermediate position and is formed in an L-shape.

According to the actuator 10 according to the third embodiment, the connector part 27 is so formed as to extend along the horizontal direction Y parallel with the second circuit board 25. With this configuration and arrangement, the connector part 27 is not formed in such a manner as to extend along the front-back direction X, which is a direction away from the output shaft 19. Thus, the dimensions of the housing 11 in the front-back direction X are suppressed to possible minimum, so that the housing 11 can be downsized. If, in particular, the connector part 27 is so formed as to extend along the same direction as the direction where the bulging portion 99 is bulged outward, an increase in the dimensions of the entire housing 11 in the horizontal direction Y is suppressed, thereby effectively contributing to the downsizing of the housing 11.

While the preferred embodiments of the present invention have been described using specific terms, such description is for the purpose of only illustrating the principle and applications of the present invention, and it is to be understood that modifications or changes and variations in arrangement may be further made without departing from the spirit or scope of the appended claims that underlie the technical ideas of the present invention.

The actuators 10 according to the above-described embodiments are used for an automotive air conditioning system. However, this should not be considered as limiting and, for example, the actuators 10 may be used for a power window and so forth. Also, the use of the actuators 10 is not limited to a vehicle.

The configuration of and the detection method for the rotation sensor 22 are not limited to the above-described configurations and methods as long as the rotation sensor 22 has the rotation detection pattern 58, with which to generate the detection signal indicating the rotational position of the output shaft 19, and the output terminal 65C capable of outputting the thus generated detection signal from the rotation detection pattern 58. Though, in the above-described embodiments, a description has been given of an example where the rotation sensor 22 is constituted by the first circuit board 23, the rotation sensor 22 may be constituted by a rotary sensor where the first circuit board 23 and the brush are contained in the casing.

In still another modification, the rotation sensor 22 may constitutes a brush-type encoder by combining the encoder with the brush. In this case, a pulse signal (instead of the voltage signal in response to the rotational position of the output shaft 19) is generated, by rotation detection pattern 58, as the detection signal indicative of the rotational position of the output shaft 19. In this case, the pulse signal serving as the detection signal is outputted from the output terminal 65C, and the rotational position of the output shaft 19 can be detected by counting the pulse signals. In this case, too, the rotation sensor 22 and the second circuit board 25 are provided separately from each other. This therefore eliminates the need of the reflow process performed on the rotation sensor 22. Thus, the rotation detection pattern 58 of the rotation sensor 22 will not be subjected to the influence of heat generated during the reflow process, and the occurrence of change in the position of the pattern otherwise caused by the heat is suppressed. Hence, the performance change in the rotation detection pattern 58 is suppressed.

Also, in the above-described example, the brush is so configured as to be rotatable integrally with the output shaft 19. Instead of the brush, the rotation detection pattern 58 may be so configured as to be rotatable integrally with the output shaft 19. In other words, the configuration is not limited as long as the brush and the rotation detection pattern 58 are relatively rotatable when the output shaft 19 is rotated. Even if either the brush or the rotation detection pattern 58 rotates, the contact position of the brush relative to the rotation detection pattern 58 varies when the output shaft 19 rotates. Thereby, the detection signal in response to the rotational position of the output shaft 19 is outputted from the output terminal 65C.

A description has been given of an example where the rotation sensor 22 is arranged between the output gear 51 and the lower-side casing 13 and where the second circuit board 25 is disposed parallel with the axial direction of the output shaft 19. However, the arrangement and orientation of the rotation sensor 22 and the second circuit board are not limited to the above-described arrangement and orientation.

A description has been given of an example where the housing 11 is configured such that the circuit board insertion part 81 and the notch 82 are formed in the lower-side casing and such that the first lid part 83 and the second lid part 84 are formed in the upper-side casing 15. However, the circuit board insertion part 81, the notch 82, the first lid part 83 and the second lid part 84 may not be formed at all. In such a case, the rotation sensor 22 and the second circuit board 25 may be assembled inside the lower-side casing 13 in a state where the rotation sensor 22 and the second circuit board 25 are each connected in advance in an integrated manner. Also, in such a case, the positioning parts 93 and 95 of the lower-side casing 13 may not be provided at all.

A description has been given of an example where the connector part 27 is provided on the second side wall 15b of the upper-side casing 15. In still another modification, the connector part 27 may be provided on the second bottom wall 15a of the upper-side casing 15, or the first bottom wall 13a or the first side wall 13b of the lower-side casing 13. If the connector part 27 is provided on the first bottom wall 13a or the second bottom wall 15a, the connector part 27 will be formed in a cylindrical shape such that the connector part 27 extends along the axial direction of the output shaft 19 (the height direction Z). In this case, the connector part 27 is so formed as to extend along the axial direction Z, which is a direction parallel with the second circuit board 25. In this case, too, the connector part 27 is not formed in such a manner as to extend along the front-back direction X, which is a direction away from the output shaft 19. Thus, the dimensions of the housing 11 in the front-back direction X are suppressed to possible minimum, so that the housing 11 can be downsized. In a direction (the downward direction in FIG. 2) where the output shaft 19 protrudes from the housing 11, namely in the downward direction of the axial direction Z of the output shaft 19, there are normally provided driven members such as a damper driven by the actuator 10. Thus, in the light of suppressing the interference with the driven members, it is preferable that the connector part 27 be so formed as to extend in a direction opposite to the direction where the output shaft 19 protrudes from the housing 11, namely in the upward direction of the axial direction Z of the output shaft 19.

Although the second circuit board 25 is positioned to the lower-side casing 13 by having the header housing 79 engaged with the positioning parts 93 and 95, it suffices that part of the second circuit board 25 be engaged with the positioning parts 93 and 95 so as to position the second circuit board 25 to the lower-side casing 13.

A description has been given of an example where the power supply circuit 101, the driver circuit 103, the communication control unit 107 and the motor control unit 109 in the second circuit board 25 are built into a single IC chip 75. In still another modification, these components may be built into separate electronic components such as separate IC chips. In such a case, as shown in FIG. 5 and so forth, the electronic components such as IC chips may be mounted on the inner surface 25b of the second circuit board 25 instead of the outer surface 25a thereof or may be mounted on both the inner surface 25b and the outer surface 25a thereof. Although the communication control unit 107 carries out the serial communication with the ECU 210, using the communication line 223, the communication control unit 107 may carry out a parallel communication or wireless communication instead of the wired communication.

Figure 13:
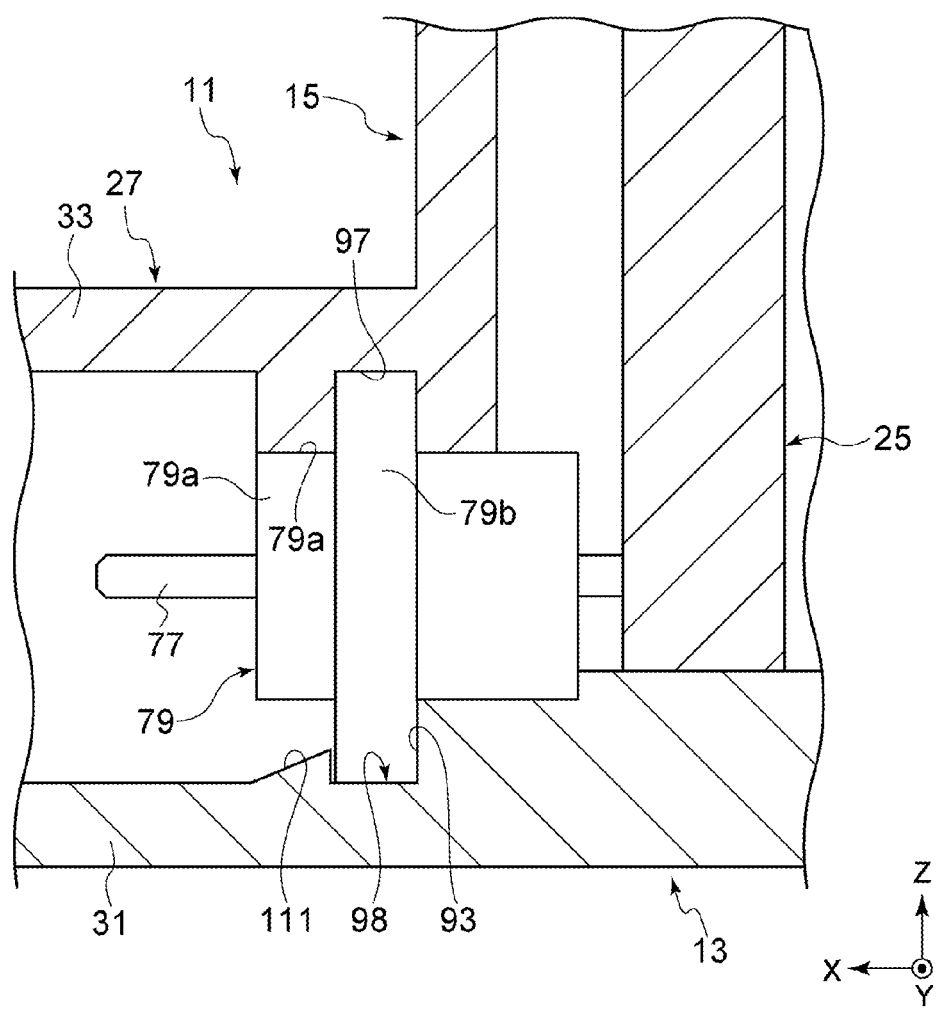
FIG. 13 is a partial cross-sectional view of a header housing, according to a modification, as viewed from a directional axis along the horizontal direction.

FIG. 13 is a partial cross-sectional view of the header housing 79, according to a modification, as viewed from a directional axis along the horizontal direction. The lower-side casing 13 has a second position holding section 98 that holds the protrusion 79b of the header housing 79. The second position holding section 98 is formed in a groove shape extending along the horizontal direction Y where the protrusion 79b extends. When the second circuit board 25 is assembled inside the lower-side casing 13, an engagement state of the protrusion 79b with the second position holding section 98 restricts the movement of the header housing 79 in the front-back direction X. Thereby, the second circuit board 25 can be held by the second position holding section 98 during a process from the time when the second circuit board 25 is assembled inside the lower-side casing 13 until the time when the upper-side casing 15 is assembled to the lower-side casing 13.

A guide face 111 is formed, on an inner surface of the first bottom face part 31 of the lower-side casing 13, in a front area (on the left side in FIG. 13) in relation to the second position holding section 98. When the second circuit board 25 is inserted into the inside from the outside through the circuit board insertion part 81 (see FIGS. 7A and 7B) of the lower-side casing 13, the header housing 79 can be placed in the second position holding section 98 while the header housing 79 is being guided along the guide face 111.

What is claimed is:
1. A motor actuator comprising:
a housing;
a motor contained in the housing;

an output shaft that rotates together with rotation of a rotational shaft of the motor; and a rotation sensor and a circuit board that are contained in the housing, the rotation sensor including:

a rotation detection pattern for generating a detection signal indicating a rotational position of the output shaft; and an output terminal capable of outputting the detection signal from the rotation detection pattern, wherein a terminal connection part to which the output terminal is connected is provided in the circuit board, and an electronic component including a communication control unit for controlling a communication with an external control apparatus is mounted on the circuit board, wherein the housing is configured by assembling a first casing and a second casing, the first casing and the second casing being of a shape such that the housing is divided in an axial direction of the output shaft, wherein the terminal connection part of the circuit board has a terminal hole through which a tip of the output terminal is inserted, and wherein a circuit board insertion part, through which the circuit board is inserted to inside from outside of the first casing in a direction perpendicular to the axial direction, is formed, on the first casing, in a position opposite to an outer surface of the circuit board located on a side where the tips of the output terminals protrude from the terminal holes.

2. A motor actuator according to claim 1, wherein the circuit board is contained in the housing such that the circuit board is parallel with an axial direction of the output shaft.

3. A motor actuator according to claim 2, wherein the housing has a connector part through which an external connector is mounted, and wherein the circuit board is arranged between the rotation sensor and the connector part.

4. A motor actuator according to claim 2, wherein the housing has a connector part through which an external connector is mounted, wherein a plurality of connector terminals arranged inside the connector part are mounted on the circuit board, wherein a terminal hole through which a tip of the output terminal is inserted is formed in the terminal connection part, and wherein the plurality of connector terminals are arranged in a direction parallel with the circuit board and perpendicular to a direction away from the terminal hole.

5. A motor actuator according to claim 1, wherein the housing has a connector part through which an external connector is mounted, and wherein the circuit board is arranged between the rotation sensor and the connector part.

6. A motor actuator according to claim 1, wherein the circuit board is contained in the housing such that the circuit board is parallel with an axial direction of the output shaft, wherein the housing has a connector part through which an external connector is mounted, and wherein the connector part is formed such that the connector part extends along a direction parallel with the circuit board.

7. A motor actuator according to claim 1, wherein a lid part, which covers the circuit board insertion part, is formed in the second casing.

8. A motor actuator according to claim 1, wherein a positioning part, which positions the circuit board in a direction where the tips of the output terminals extend.

9. A motor actuator according to claim 1, wherein the housing has a connector part through which an external connector is mounted, wherein a plurality of connector terminals arranged inside the connector part are mounted on the circuit board, wherein a terminal hole through which a tip of the output terminal is inserted is formed in the terminal connection part, and wherein the plurality of connector terminals are arranged in a direction parallel with the circuit board and perpendicular to a direction away from the terminal hole.

10. A motor actuator according to claim 1, wherein the housing has a connector part through which an external connector is mounted;

wherein the connector part includes a bottom face part, a ceiling face part and a lateral face part which form a cylindrical cross section, and wherein the first casing has the bottom face part, and does not have a lateral face part formed upright from the bottom face part.

* * * * *